United States Patent [19]
Johannesson

[11] Patent Number: 5,359,634
[45] Date of Patent: Oct. 25, 1994

[54] REACTOR CORE FOR A BOILING WATER NUCLEAR REACTOR

[75] Inventor: Sven-Birger Johannesson, Västerås, Sweden

[73] Assignee: ABB Atom AB, Västerås, Sweden

[21] Appl. No.: 110,734

[22] Filed: Aug. 23, 1993

[30] Foreign Application Priority Data

Sep. 30, 1992 [SE] Sweden .............................. 9202827-3

[51] Int. Cl.⁵ .............................................. G21C 3/30
[52] U.S. Cl. .................... 376/428; 376/435; 376/370
[58] Field of Search ......................... 376/428, 435, 370

[56] References Cited

U.S. PATENT DOCUMENTS

| | | | |
|---|---|---|---|
| 4,629,599 | 12/1986 | Crowther et al. | 376/435 |
| 5,008,070 | 4/1991 | Aoyama et al. | 376/428 |
| 5,176,877 | 1/1993 | Nakajima et al. | 376/435 |

Primary Examiner—Donald P. Walsh
Assistant Examiner—Frederick H. Voss
Attorney, Agent, or Firm—Watson, Cole, Grindle & Watson

[57] ABSTRACT

A reactor core for a boiling water nuclear reactor comprises a plurality of vertical fuel assemblies (40), each one containing a plurality of fuel rods (10, 10a, 10b) with enriched nuclear fuel material, which are arranged between a bottom tie plate (11) and a top tie plate (12) in a surrounding vertical fuel channel (1). Each fuel assembly is designed with an inlet (3) for water for conducting water in through the bottom tie plate, through the vertical fuel channel, and out through the top tie plate. Further, each fuel assembly is arranged with intermediate gaps (37a, 37b) with respect to adjacent fuel assemblies and possibly with a channel (32, 50) arranged internally in the fuel assembly for conducting water through the gaps and through the internal channel (if any) in a vertical direction from below and upwards through the core. Each one of at least the main part of those fuel rods, central rods (10a), which in a fuel assembly are surrounded by fuel rods, edge rods (10b), which are located close to a water gap or close to an internal water channel, is arranged with a ratio of the enrichment in the central rod in question to the medium enrichment for the central rods and the edge rods, in a horizontal section, which is lower for an upper part than for a lower part of the central rod.

8 Claims, 7 Drawing Sheets

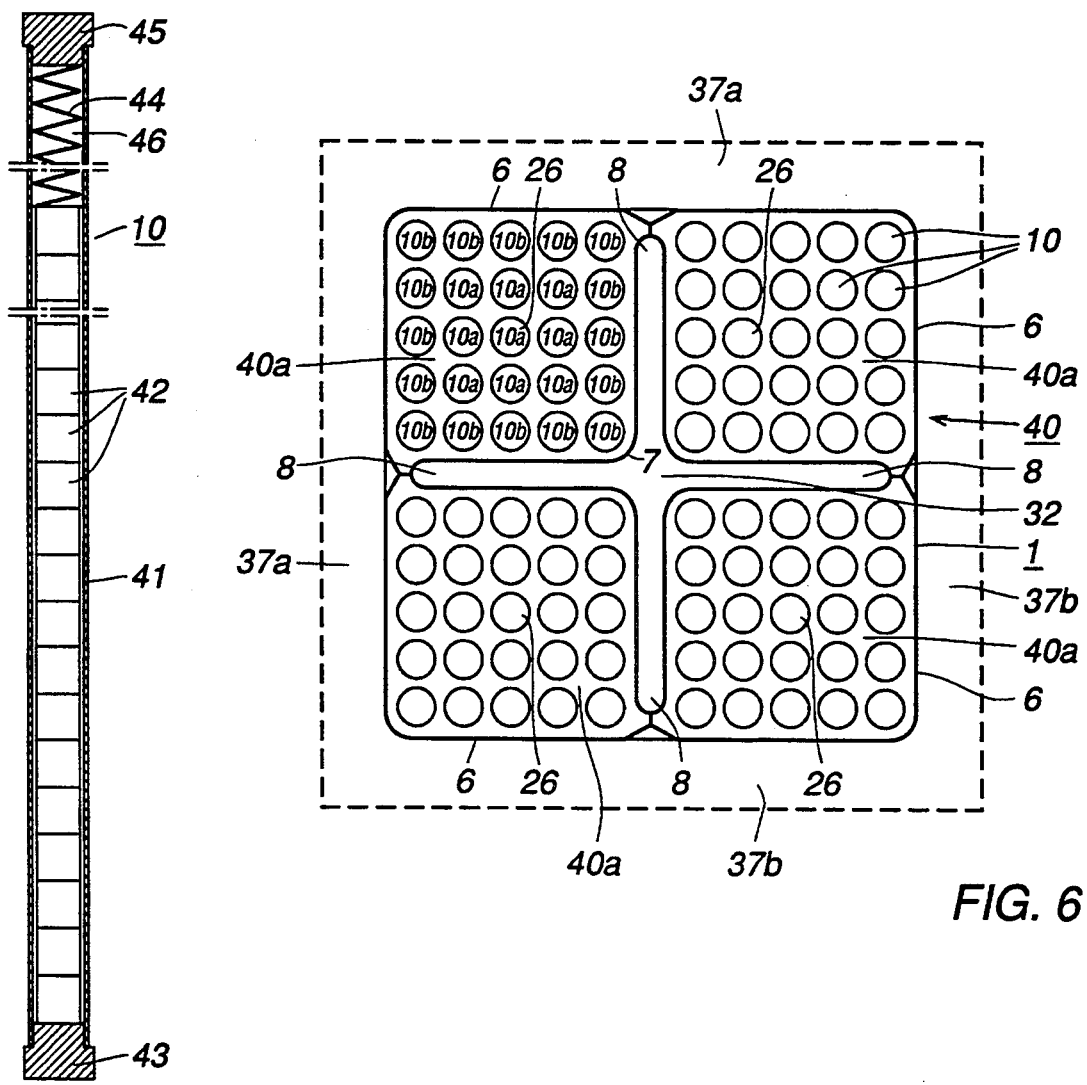

REACTOR CORE FOR A BOILING WATER NUCLEAR REACTOR

BACKGROUND AND SUMMARY OF THE INVENTION

The present invention relates to a reactor core for a boiling water nuclear reactor with a plurality of vertical fuel assemblies, each fuel assembly containing a plurality of vertical fuel rods with enriched nuclear fuel material, which fuel rods are arranged between a bottom tie plate and a top tie plate in a surrounding vertical fuel channel. Each fuel assembly is formed with an inlet for water for conducting water in through the bottom tie plate, through the space between the fuel rods in the vertical fuel channel, and out through the top tie plate. Further, each fuel assembly is arranged with intermediate gaps with respect to adjoining fuel assemblies and possibly with a channel, internally arranged in the fuel assembly, for conducting water through the gaps and through the internal channel (if any) in the vertical direction from below and upwards through the core.

Usually, each fuel rod in a fuel assembly of the kind described above is arranged with the same enrichment content of fissile material (hereinafter referred to as enrichment only) in its entire length.

During operation of a bailing water nuclear reactor with a core containing several fuel assemblies of the above-mentioned kind, there may be a risk of so-called dryout, that is, that the water film present on the surface of each fuel rod disappears or is broken down in restricted areas, which locally leads to a considerably deteriorated heat transfer between the fuel rod and the water conducted through the fuel assembly, resulting in a greatly increased wall temperature of the fuel rod. The increased wall temperature may result in damage with serious consequences arising on the fuel rod.

In current designs with the same enrichment in the whole length of each fuel rod, in order to achieve a sufficient dryout margin, the requirements for the effect which is otherwise attainable are lowered. The present invention makes it possible to improve the dryout margin without deteriorating the attainable effect. The favourable result is achieved according to the invention by a redistribution of the fuel while achieving a special enrichment distribution in the longitudinal direction of the fuel rods.

What more particularly characterizes the present invention is that each one of at least the main part of the fuel rods, central rods, which in a fuel assembly are surrounded by fuel rods, edge rods, which are located close to a water gap or an internal water channel, is arranged with a ratio of the enrichment in the central rod in question to the medium enrichment for the central rods and the edge rods in a horizontal section, which is lower for an upper part than for a lower part of the central rod.

Preferably, each one of at least the main part of the edge rods is arranged with a ratio of the enrichment in the edge rod in question to the medium enrichment for the central rods and the edge rods in a horizontal section, which is higher for the upper part than for the lower part of the edge rod.

The length of the upper part suitably constitutes one-fourth to two-thirds, preferably one-third to two-thirds, of the active length of tile fuel rod and the lower part the remainder of the active length of the fuel rod. By the active length of the fuel rod is meant that axial part of the fuel rod which contains nuclear fuel material.

According to an advantageous embodiment of the invention, which provides a good shutdown margin for the reactor, the medium enrichment of the central rods and the edge rods in a horizontal section is 5-15% lower in the area of the upper part of the fuel rods than in tile area of the lower part of the fuel rods.

It is known per se to arrange fuel rods with different enrichments in different parts of the length of the fuel rods in order to influence, in other ways than those stated above, the properties of the reactor core and the operation of a nuclear reactor.

BRIEF DESCRIPTION OF THE DRAWINGS

The invention will be explained in greater detail by means of examples with reference to the accompanying drawings, wherein FIG. 1, in a vertical section through the line I—I in FIG. 2, shows a fuel assembly suitable for the application of the invention and composed of four sub-assemblies; FIG. 5 shows a fuel rod in the fuel assembly in a vertical section; FIG. 6 shows a fuel assembly according to FIGS. 1-3 with designations for central and edge rods; FIGS. 7 and 8 show a detailed enrichment layout for the upper and lower parts, respectively, of the fuel assembly according to FIG. 6.

DETAILED DESCRIPTION OF THE PREFERRED EMBODIMENTS

Figure 1:
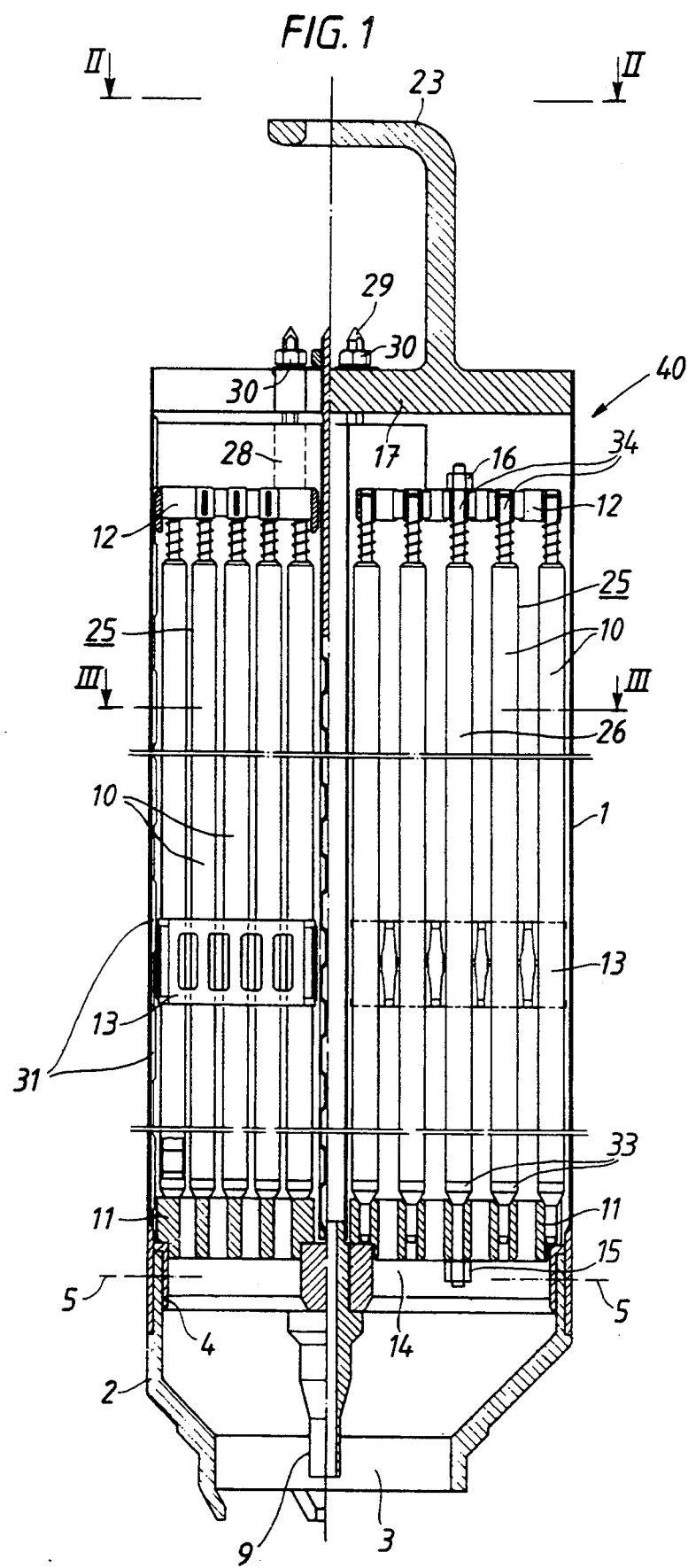
Figure 2:
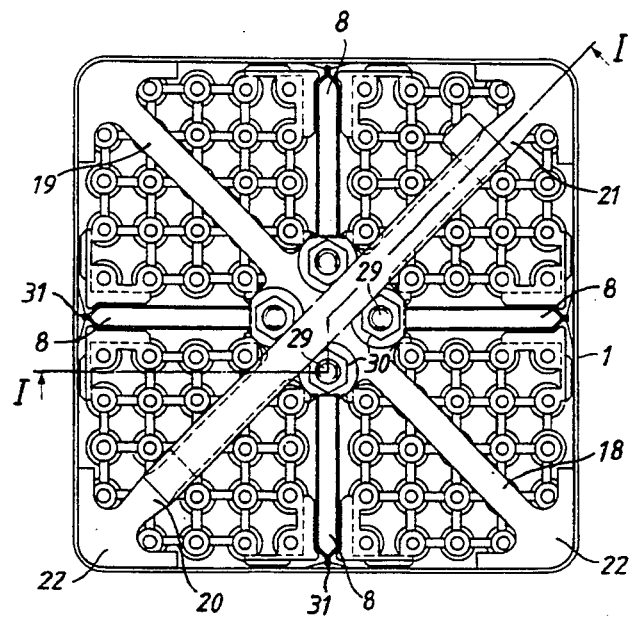
FIG. 2 shows the same composed fuel assembly in a view perpendicular to a horizontal plane through the line II—II in FIG. 1.
Figure 3:
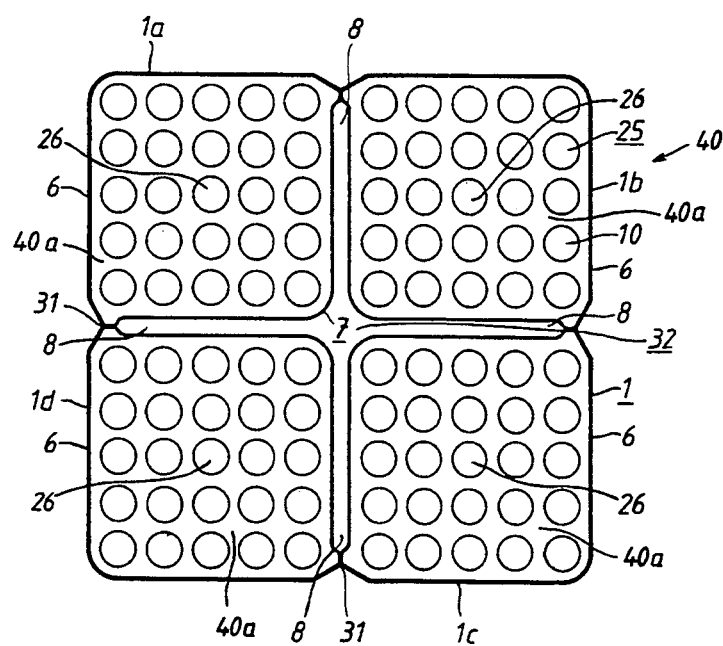
FIG. 3 shows a horizontal section through the line III—III in FIG. 1.

In FIGS. 1-3, 1 designates a fuel channel of substantially square cross section. The fuel channel surrounds with no significant play an upper, square portion of a bottom part 2 with a circular, downwardly-facing inlet opening 3 for cooling water and moderator water. Besides supporting the fuel channel 1, the bottom part 2 supports a supporting plate 4. At its bottom the fuel channel 1 has a relatively thick wall portion which is fixed to the bottom part 2 and the supporting plate 4 by means of a plurality of horizontal bolts, indicated by dash-dotted lines 5. By means of a hollow support member 7 of cruciform cross section, the fuel channel 1 is divided into four vertical, tubular parts 6 of at least substantially square cross section. The support member 7 is welded to the four walls 1a, 1b, 1c and 1d of the fuel channel 1 and has four hollow wings 8. The vertical cruciform channel formed by the support member is designated 32 and is connected at its bottom to an inlet tube 9 for moderator water. Each tubular part 6 contains a bundle 25 of twenty-five fuel rods 10 (and any non-energy producing rods). The rods are arranged in a symmetrical lattice in five rows each containing five rods. Each rod is included in two rows perpendicular to each other. Each bundle is arranged with a bottom tie plate 11, a top tie plate 12 and a plurality of spacers 13. A fuel rod bundle 25 with a bottom tie plate 11, a top tie plate 12, a spacer 13 and a tubular part 6 forms a unit which in this application will be referred to as sub-assembly and designated 40a, whereas the device illustrated in FIGS. 1-3 comprising four such sub-assemblies will be referred to as a composed fuel assembly and designated 40. In the composed fuel assembly the four bottom tie plates 11 are supported by the supporting plate 4 and are each partially inserted into a corresponding square hole 14 therein. In each sub-assembly, at least one of the fuel rods is designed with relatively long, threaded end plugs 33 and 34 of solid cladding material, the lower end plug 33 being passed through the bottom tie plate 11 and provided with a nut 15, the upper end plug 34 being passed through the top tie plate 12 and provided with a nut 16. In the embodiment show, x, the centre rod 26 is designed in this way. This rod also serves as a spacer holder rod. An upper end port ion of the fuel channel 1 surrounds a cruciform lifting plate 17 with four horizontal arms 18, 19, 20 and 21, which extend from a common central portion. At its outer end, each arm has an arrowhead-like portion 22 which, in respective corners of the fuel channel 1, makes contact with the inner wall surface of the fuel channel 1. A lifting handle 23 is fixed to the arms 20 and 21. The lifting plate 17 and the handle 23 together form a lifting member of steel cast in one piece. The lifting plate 17 is fixed to the support member 7 by inserting each one of four vertical bars 28 into a corresponding wing 8 of the support member 7 and welding them thereto. At its top, each bar 28 has a vertical, bolt-like portion 29 which is passed with a play through a corresponding hole in the mid-portion of the lifting plate 17 and provided with a nut 30. As is clear from the figures, the fuel channel 1 is provided with indentations 31, intermittently arranged in the longitudinal direction, to which the support member 7 is welded.

Figure 4:
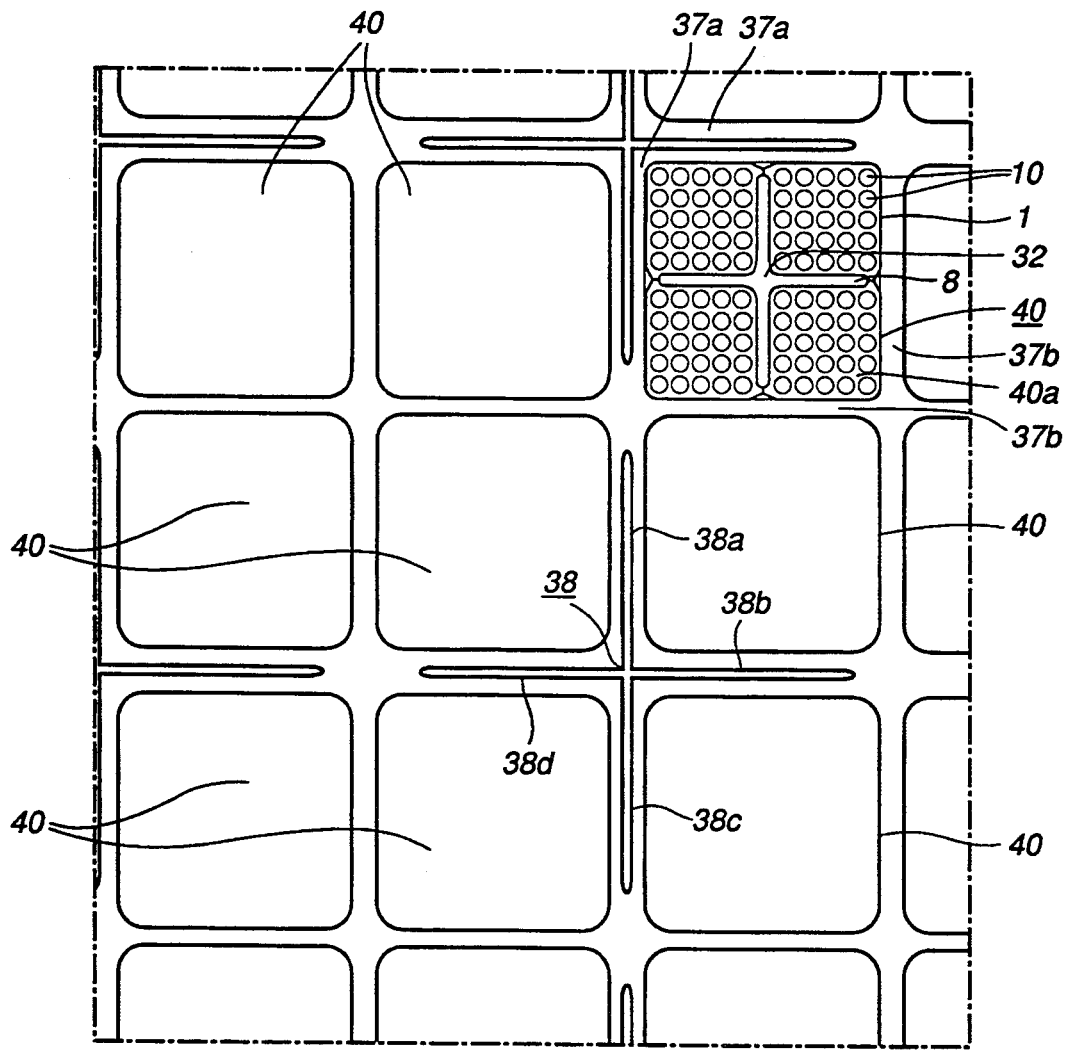
FIG. 4 shows a horizontal section of part of a reactor core.

FIG. 4 shows a small part of a reactor core. The section comprises nine whole fuel assemblies 40 of the kind illustrated in FIGS. 1–3. Of the fuel assemblies only one is shown in detail, the other ones only as empty squares. The spaces between the fuel rods 10 within each fuel assembly 40a is traversed by water as is the cruciform channel 32 in the fuel assembly 40. The gaps 37a and 37b between the fuel assemblies 40 are also traversed by water. Those gaps 37a into which control rods 38 can be inserted are wider than those gaps 37b into which no control rods can be inserted. The control rods 38 have blades 38a, 38b, 38c and 38d which form a right-angled cross.

As is clear from FIG. 5, each fuel rod 10 includes a cladding tube 41 and a large number of circular-cylindrical pellets 42 stacked on top of each other in the axial direction of the tube. Besides those pellets which are located nearest to each end of the fuel rods, which pellets consist of oxide of natural uranium, the pellets conventionally consist of uranium dioxide enriched with respect to U 235. In a small number of the pellets the uranium dioxide is mixed with a burnable absorber such as $Gd_2O_3$. The lowermost pellet rests rigidly on an end plug 43 welded to the lower end of the rod, and the uppermost pellet is pressed downwards by a spiral spring 44, which is tensioned against an end plug 45 welded to the upper end of the tube, such that a plenum 46 filled with helium is created. This plenum without nuclear fuel material is thus not part of the active length of the fuel rod. Pellets of natural uranium are included in the active length of tile fuel rod.

Figures 7, 8:
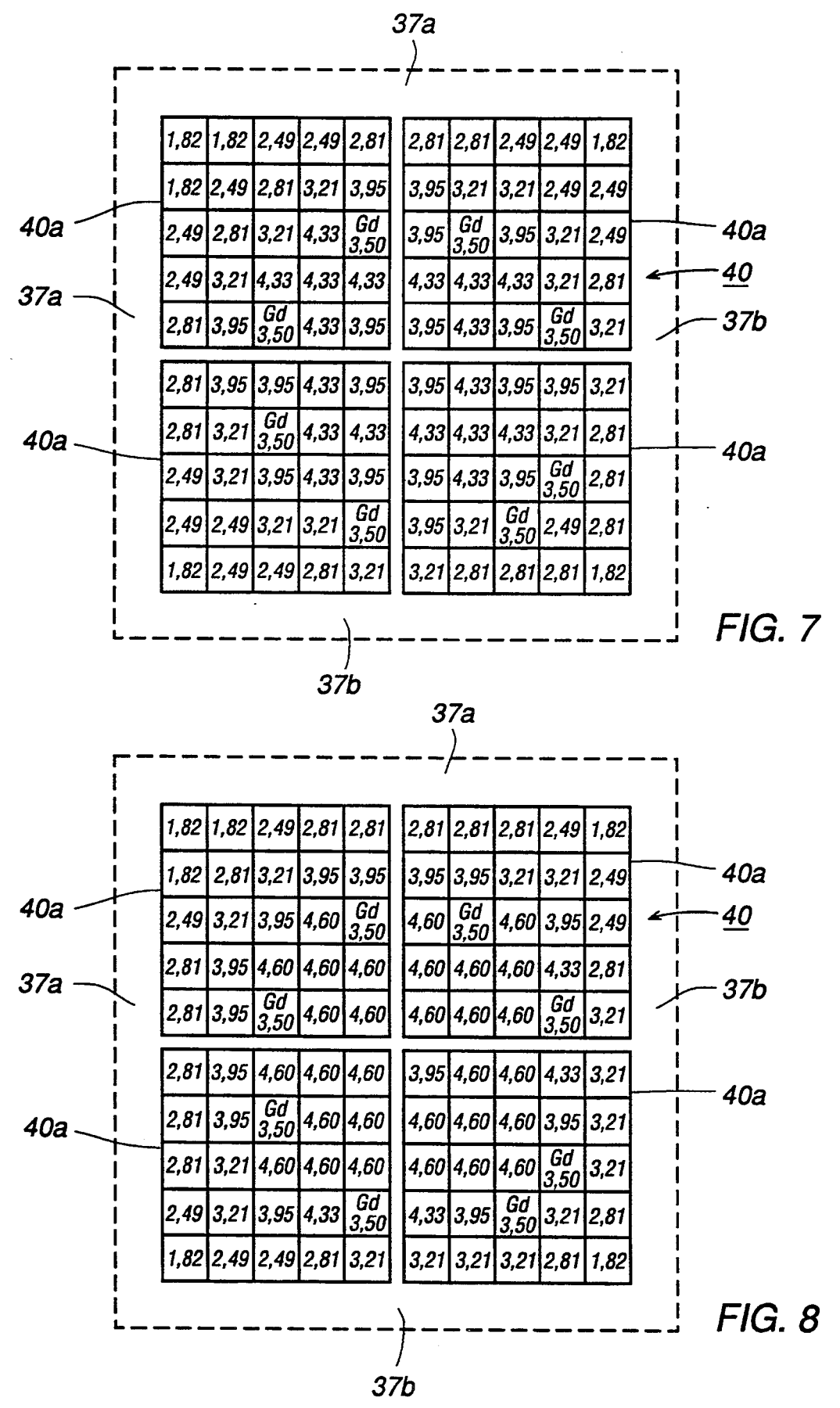

FIGS. 6–8 illustrates a fuel assembly 40 adapted for use according to the present invention. As is clear from FIG. 6, the fuel assembly has fuel rods, central rods 10a, which are surrounded by fuel rods, edge rods 10b, which are located close to a water gap 37a, 37b or close to an internal water channel 32. Central rods and edge rods are designated 10a and 10b, respectively, in only one sub-assembly 40a. The other sub-assemblies are constructed in an analogous manner. In the exemplified case, the rods 10a, 10b are built up from uranium dioxide pellets with seven different enrichments of U 235, namely, 1.82%, 2.45%, 2.81%, 3.21%, 3.95%, 4.33% and 4.60%. In addition, a smaller number of rods with an enrichment of 3.50% are included together with gadolinium oxide in a content of 3.15%. All the figures stated denote the initial content of U 235 and $Gd_2O_3$, respectively, calculated on the initial weight of uranium. The main part of the central rods 10a are in an upper part, which constitutes the uppermost one-third of thee active length of the rod, arranged with an enrichment which is lower than in a lower part, which constitutes the lower-most part of the active length of the rod, more particularly two-thirds thereof. The enrichment for the pellets in the upper and lower parts, respectively, of the different fuel rods is shown in detail in FIGS. 7 and 8, respectively, in which each square corresponds to an identically located fuel rod 10a, 10b in FIG. 6. The rods with gadolinium oxide, besides being marked with the enrichment of U 235, are also marked with Gd. In the exemplified case, the medium enrichment for central rods and edge rods in a horizontal section in the area where the central rod in question is located constitutes 3.31% in the upper part of the rod and 3.60% in the lower part of the rod, that is, the medium enrichment is 8% lower in the upper than in the lower part. For each one of at least the main part of the central rods 10a, the ratio of the enrichment in the rod in question to the medium enrichment, in a horizontal section, is lower in the upper part than in the lower part of the fuel rod. For the main part of the edge rods 10b, the ratio of the enrichment to the medium enrichment, in a horizontal section, is higher in the upper part than in the lower part of the edge rod.

Figure 9:
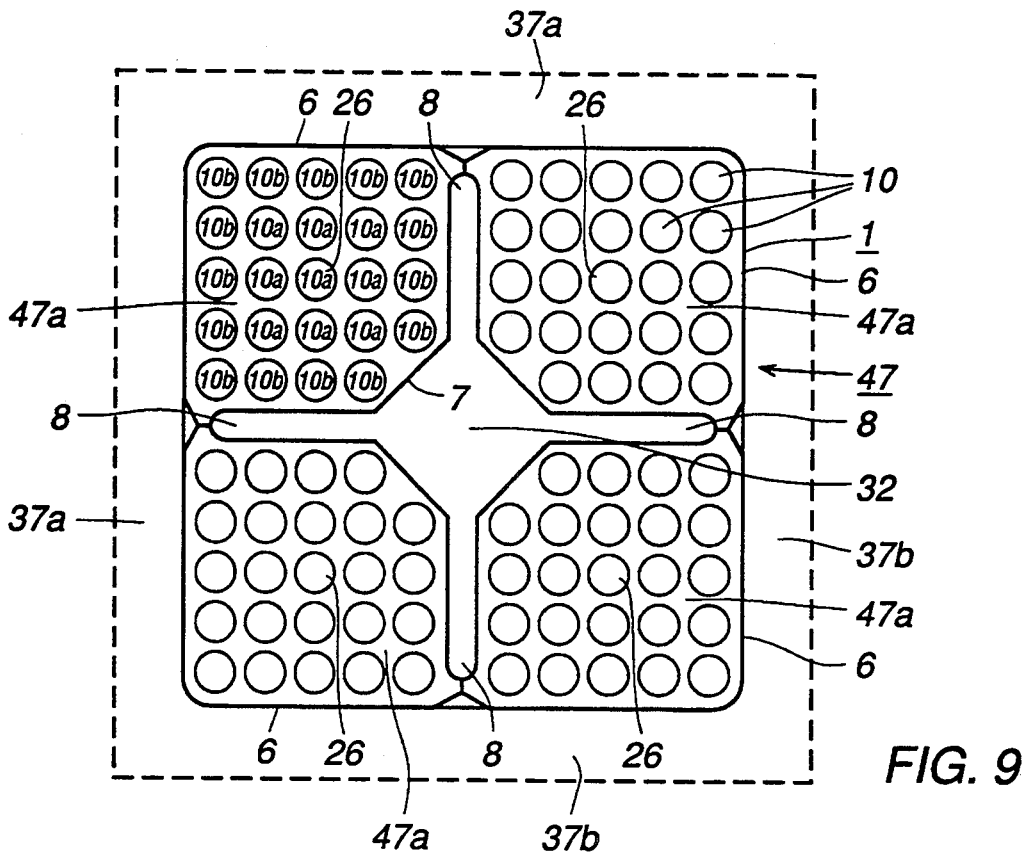
FIGS. 9-12 show alternative embodiments of fuel assemblies which are suitable for use according to the present invention.

FIG. 9 illustrates another fuel assembly 47, which is suitable for use according to the present invention. The fuel assembly differs from the fuel assembly shown in FIG. 6 in that each sub-assembly 47a consists of 24 fuel rods (and any non-energy producing rods), these being arranged in a lattice of 5×5 rods with that rod removed which is located nearest the centre of the cruciform water channel 32 while forming an enlarged centre of the water channel.

Figure 10:
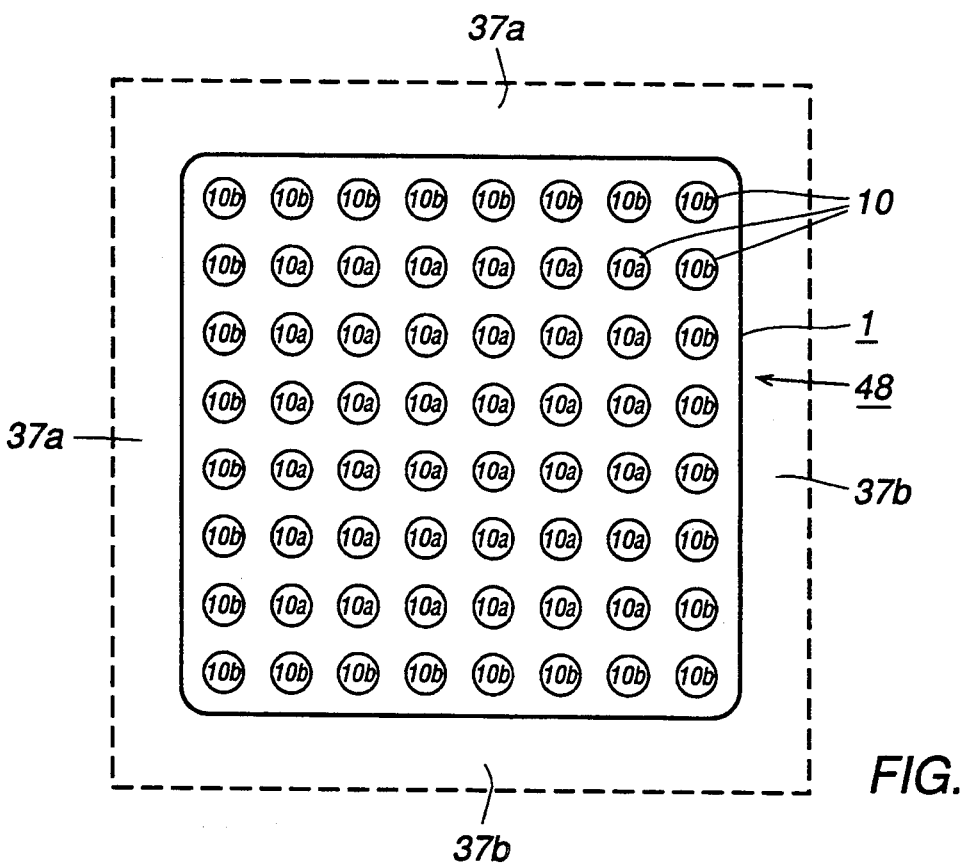

In the embodiment according to FIG. 10, the fuel assembly 48 has no internal water channel. The fuel assembly consists of 64 fuel rods (and any non-energy producing rods) arranged in a lattice of 8×8 rods. Those rods which are facing the water gaps 37a and 37b, that is edge rods, are designated 10b as before, and those rods which are surrounded by edge rods, that is central rods, are designated 10b, also as before.

Figure 11:
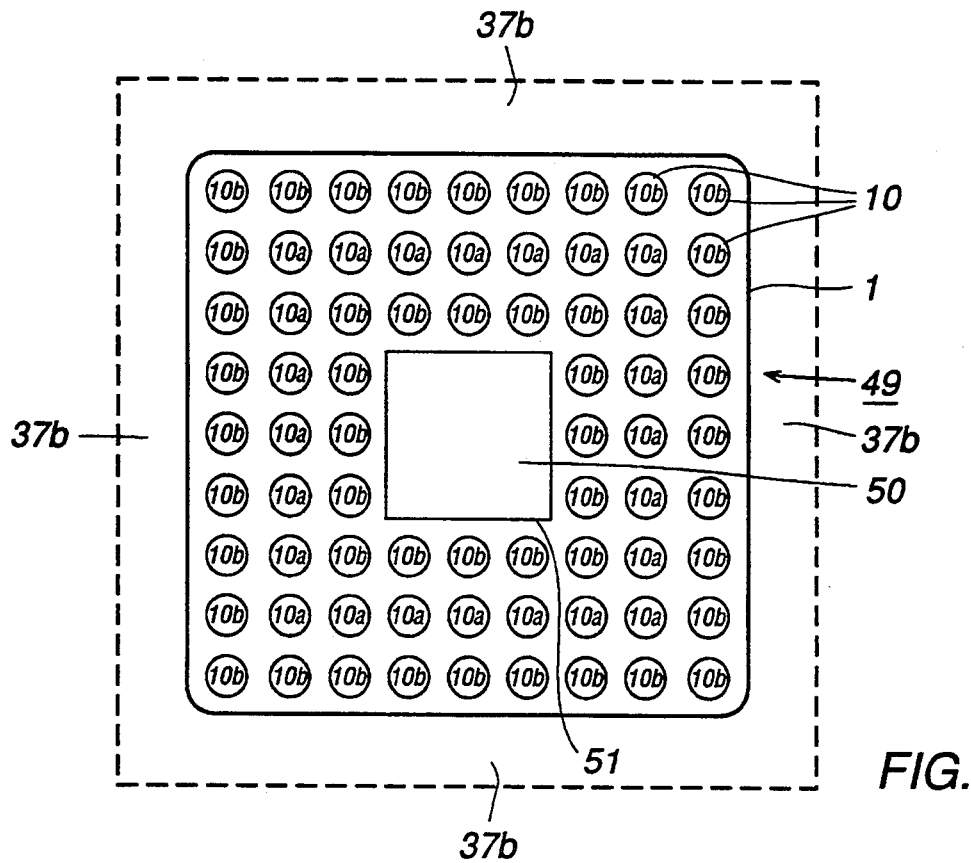
Figure 12:
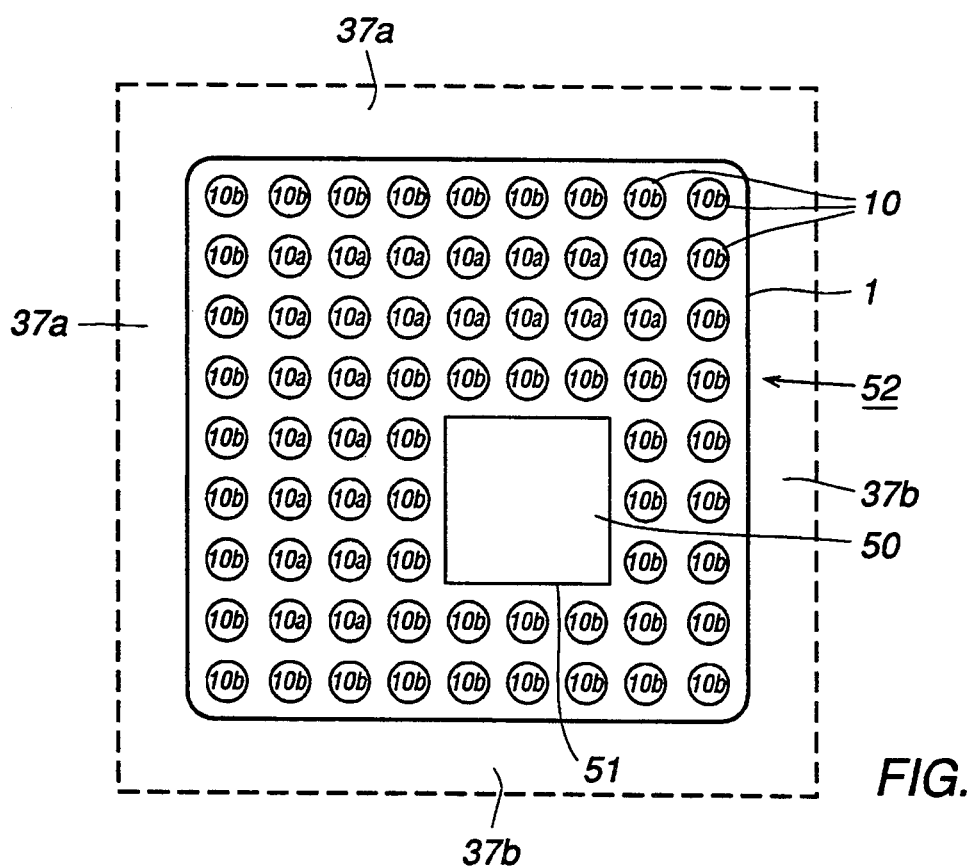

The fuel assemblies 49 and 52, respectively, illustrated in FIGS. 11 and 12 are provided with an internally arranged vertical channel 50 through which water is conducted in a vertical direction from below and upwards through the assembly. The wall of the channel is designated 51. Both the fuel assembly 49 and the fuel assembly 52 contain 9×9 fuel rods with 3×3 rods removed for arranging the channel 50, that is, in total 72 fuel rods. In the fuel assembly according to FIG. 11, the channel 50 is centrally located and the water gaps 37b have the same width all around. In the fuel assembly according to FIG. 12, the channel 50 is displaced in a direction towards the gaps 37b whereas the gaps 37a, where control rods can be inserted, are wider than the gaps 37b. The rods which are facing the water gaps 37b (FIG. 11) and the water gaps 37a and 37b (FIG. 12), respectively, and those which are facing the channel 50, that is edge rods, are in both figures designated 10b and the rods which are surrounded by the edge rods, that is central rods, are designated 10a.

The same situation that applies to the fuel assembly according to FIGS. 6-8 also applies to the fuel assemblies according to FIGS. 9, 10, 11 and 12, that is, that for each one of at least the main part of the central rods 10, the ratio of the enrichment in the central rod in question to the medium enrichment, in a horizontal section, is lower in the upper part than in the lower part of the rod. Further, referring to these fuel assemblies, for each one of the main part of the edge rods 10b, the ratio of the enrichment in the edge rod in question to the medium enrichment, in a horizontal section, is higher in the upper part than in the lower part of the rod.

I claim:

1. A reactor core for a boiling water nuclear reactor with a plurality of vertical fuel assemblies, each fuel assembly containing a plurality of fuel rods with enriched nuclear fuel material which are arranged between a bottom tie plate and a top tie plate in a surrounding vertical fuel channel, wherein each fuel assembly is formed with an inlet for water for conducting water in through the bottom tie plate, through the space between the fuel rods in the vertical fuel channel, and out through the top tie plate, and each fuel assembly is arranged with intermediate gaps with respect to adjacent fuel assemblies for conducting water through the core, wherein at least some fuel assemblies are arranged with fuel rods with different enrichment at different levels, wherein each one of at least a main part of those fuel rods, central rods, which in a fuel assembly are surrounded by fuel rods, edge rods, which are located adjacent to a water gap, are arranged with a ratio of the enrichment in the central rod in question to the medium enrichment for the central rods and the edge rods, in a horizontal section, which is lower for an upper part than for a lower part of the central rod, and each one of at least a main part of the edge rods is arranged with a ratio of the enrichment in the edge rod in question to the medium enrichment for the central rods and the edge rods, in a horizontal section, which is higher for the upper part than for the lower part of the edge rod.

2. A reactor core according to claim 1, wherein the length of the upper part constitutes one-fourth to two-thirds of the active length of the fuel rod.

3. A reactor core according to claim 2, wherein the medium enrichment of the central rods and the edge rods in a horizontal section is 5-15% lower in the area of the upper part of the fuel rods than in the area of the lower part of the fuel rods.

4. A reactor core according to claim 1, wherein the medium enrichment of the central rods and the edge rods in a horizontal section is 5-15% lower in the area of the upper part of the fuel rods than in the area of the lower part of the fuel rods.

5. A reactor core for a boiling water nuclear reactor with a plurality of vertical fuel assemblies, each fuel assembly containing a plurality of fuel rods with enriched nuclear fuel material which are arranged between a bottom tie plate and a top tie plate in a surrounding vertical fuel channel, wherein each fuel assembly is formed with an inlet for water for conducting water in through the bottom tie plate, through the space between the fuel rods in the vertical fuel channel, and out through the top tie plate, and each fuel assembly is arranged with intermediate gaps with respect to adjacent fuel assemblies with an internally arranged channel for conducting water through the gaps and through the internal channel in a vertical direction from below and upwards through the core, wherein at least some fuel assemblies are arranged with fuel rods with different enrichment at different levels, wherein each one of at least a main part of those fuel rods, central rods (10a), which in a fuel assembly are surrounded by fuel rods, edge rods (10b), which are located adjacent to a water gap or adjacent to the internal water channel, are arranged with a ratio of the enrichment in the central rod in question to the medium enrichment for the central rods and the edge rods, in a horizontal section, which is lower for an upper part than for a lower part of the central rod, and each one of at least a main part of the edge rods (10b) is arranged with a ratio of the enrichment in the edge rod in question to the medium enrichment for the central rods and the edge rods, in a horizontal section, which is higher for the upper part than for the lower part of the edge rod.

6. A reactor core according to claim 5, wherein the length of the upper part constitutes one-fourth to two-thirds of the active length of the fuel rod.

7. A reactor core according to claim 6, wherein the medium enrichment of the central rods and the edge rods in a horizontal section is 5-15% lower in the area of the upper part of the fuel rods than in the area of the lower part of the fuel rods.

8. A reactor core according to claim 5, wherein the medium enrichment of the central rods and the edge rods in a horizontal section is 5-15% lower in the area of the upper part of the fuel rods than in the area of the lower part of the fuel rods.

* * * * *